United States Patent [19]

Graf

[11] Patent Number: 5,284,666
[45] Date of Patent: Feb. 8, 1994

[54] METHOD FOR PREPARING FLAVORED UNPOPPED POPCORN KERNELS

[75] Inventor: Ernst Graf, Cincinnati, Ohio

[73] Assignee: Tastemaker, Cincinnati, Ohio

[21] Appl. No.: 52,193

[22] Filed: Apr. 22, 1993

[51] Int. Cl.⁵ .......................... A23L 1/00; H05B 6/00
[52] U.S. Cl. ..................... 426/242; 426/93; 426/307; 426/309; 426/243
[58] Field of Search .............. 426/241, 242, 243, 307, 426/309, 93, 618

[56] References Cited

U.S. PATENT DOCUMENTS

| | | | |
|---|---|---|---|
| 2,518,247 | 8/1950 | Nairn | 426/309 |
| 3,519,439 | 7/1970 | Dunn | 99/171 |
| 3,704,133 | 11/1972 | Kracauer | 99/83 |
| 3,843,814 | 10/1974 | Grunewald-Kirstein | 426/308 |
| 3,851,574 | 12/1974 | Katz et al. | 426/107 |
| 3,882,255 | 5/1975 | Gorham et al. | 426/235 |
| 3,961,091 | 6/1976 | Caccavale et al. | 426/307 |
| 4,096,281 | 6/1978 | Young et al. | 426/89 |
| 4,571,337 | 2/1986 | Cage et al. | 426/107 |
| 4,751,090 | 6/1988 | Belleson et al. | 426/93 |
| 4,767,635 | 8/1988 | Merritt et al. | 426/272 |
| 4,880,646 | 11/1989 | Lew et al. | 426/93 |
| 4,888,186 | 12/1989 | Cooley et al. | 426/99 |
| 4,904,487 | 2/1990 | LaBaw et al. | 426/107 |
| 4,904,488 | 2/1990 | LaBaw et al. | 426/107 |
| 4,950,859 | 8/1990 | Anderson | 426/243 |
| 5,132,125 | 7/1992 | Lew et al. | 426/93 |

Primary Examiner—George Yeung
Attorney, Agent, or Firm—Wood, Herron & Evans

[57] ABSTRACT

A method for preparing flavored unpopped popcorn kernels is disclosed involving dehydrating unpopped popcorn kernels to produce partially dehydrated kernels having retained sufficient moisture for popping and having an increased tendency to absorb an aqueous flavor liquid. Upon coating or soaking the kernels with flavor liquid and drying, popping of the kernels results in a flavored popcorn. The method provides for a low-fat or no-fat popcorn product.

20 Claims, No Drawings

METHOD FOR PREPARING FLAVORED UNPOPPED POPCORN KERNELS

BACKGROUND OF THE INVENTION

Unpopped popcorn kernels have been coated or packaged in a vegetable fat or oil, flavor and salt. The fat layer serves to fry the popcorn during heating and also serves as a coating for the added salt, colorings or various other flavorings. The fat layer also causes adherence to some extent of the salt and flavoring to the surface of the popped kernels. The required oil or fat results in an oily and greasy texture and feel as well as a high calorie content in the popped kernels. There has been greater emphasis in recent years in developing a substantially fat-free flavored popcorn product. A number of past attempts have been hampered by the inability to coat the popcorn kernels with flavor and salt in the absence of a fat layer. Typically, the flavor and salt separate from the unpopped popcorn kernels and accumulate on the bottom of the bag, thereby contributing only aroma during microwaving or cooking but no flavor during consumption.

A number of patents have issued directed to different methods for preparing popcorn products as exemplified by U.S. Pat. Nos. 3,519,439; 3,704,133; 3,843,814; 3,851,574; 3,882,255; 3,961,091; 4,096,281; 4,571,337; 4,751,090; 4,767,635; 4,880,646; 4,888,186; 4,904,487; 4,904,488 and 5,132,125. While these patents have focused on various attempts to improve methods for the preparation of flavored popped corn, these methods are still hampered by the inability to coat kernels with flavor and salt in the absence of a fat layer. Thus, there has been no satisfactory fat-free or low-fat popcorn product that has the combined properties of superior popping ability, shelf-life stability, flavor and salt retention, mouth-feel and texture.

It would be very desirable to provide a method for preparing flavored unpopped popcorn kernels having superior popping ability, flavor and salt retention, yet that are substantially fat-free. It would also be desirable to provide microwavable popcorn kernels that have the no-fat or low-fat properties, yet with mouth-feel and texture upon being consumed.

SUMMARY OF THE INVENTION

This invention is directed to a method for preparing flavored unpopped popcorn kernels and superior popped corn produced therefrom. The method provides no-fat or low-fat microwavable popcorn kernels of superior popping ability, shelf-life stability, and flavor and salt retention. The no-fat popcorn kernels of this invention have flavor and salt retention but without a fat layer as in prior art products. This invention also overcomes the problems mentioned in the background of this invention with respect to the separation of salt, flavor and other additives from the popcorn kernels during preparation and popping.

The method of this invention involves dehydrating unpopped popcorn kernels for a period of time sufficient to produce partially dehydrated kernels having retained sufficient moisture for popping and having an increased tendency to absorb an aqueous flavor liquid. The slightly dehydrated popcorn kernels are very receptive to absorption of an aqueous flavor liquid to produce flavored unpopped popcorn kernels.

In a preferred form of the invention raw popcorn kernels are slightly dehydrated in a vacuum dryer at a temperature of about 20°–40° C. for about ten minutes to cause a negative pressure which increases the tendency of the kernels to absorb both salt and flavor from an aqueous solution. The resulting flavored unpopped kernels are then soaked, coated or sprayed in a fluidized bed with an aqueous solution of flavoring. Most preferably, the flavoring includes a hydrocolloid such as starch, salt and another flavor, for instance, an artificial butter flavor. The coated popcorn kernels are then dried gently under a stream of warm air up to about 40° C. for approximately ten minutes, for example, in a convection oven or a fluidized bed dryer. The final dried product is placed into a susceptor-lined microwavable bag and stored at room temperature until it is used in the microwave oven. This method provides a no-fat popcorn.

In addition, the finished popcorn kernels according to the above technique may be coated in a fluidized bed with a very thin layer of shortening or oil in an amount of about 1% by weight of the kernels. Such a low-fat product containing about 1% oil or fat under current label and serving size guidelines can still be called a no-fat popcorn. Even at such a low level of shortening or oil, the method provides for increased flavor retention during microwave cooking, improved flavor delivery during consumption by delaying and prolonging flavor release in the mouth, increased perception of saltiness, and improved mouth-feel and texture. Thus, the method of this invention produces no-fat or low-fat microwave popcorn kernels having superior popping ability, shelf-life stability, flavor and salt retention, mouth-feel and texture.

Other advantages and objectives of this invention, and preferred modes for carrying out the method, will be further understood with reference to the following detailed description and operating examples.

DETAILED DESCRIPTION OF THE INVENTION

Raw popcorn kernels that are suitable for use in the practice of the invention can be any of a variety of kernels that ideally have a moisture content sufficient for optimum expansion of the corn during popping. These raw kernels, in the practice of the invention, are first partially dehydrated to enhance their tendency to absorb an aqueous flavor liquid such as a simple salt solution. For instance, when an aqueous salt solution is employed as the flavor liquid, it has been found that salt may be absorbed very readily into partially dehydrated popcorn kernels that have retained sufficient moisture content for popping. It is critical that the unpopped popcorn kernels are only dehydrated for a period of time sufficient to produce partially dehydrated kernels having retained sufficient moisture for popping and an increased tendency to absorb the flavor liquid. Vacuum dehydration under low temperatures on the order of about 20°–40° C. for a short period of time, for instance about 10 minutes, has been found to achieve the advantages of this invention. Weight loss during dehydration usually is on the order of about 1 to about 3%. It is also preferred to thereafter immediately soak the kernels with a flavor and salt for about 1 to 5 minutes. Of course, the amount of flavoring uptake from the aqueous flavor solution will vary, and usually a sufficient time is needed to pick up about 0.5–1% flavor, or about 1 to 4% flavor and salt, depending upon the individual flavor and sensory attributes required. Free-flowing flavored unpopped popcorn kernels are obtained after vacuum dehydration, coating with an aqueous solution of flavor composition and gentle drying. Room temperature stable unpopped kernels are obtained by this method.

As indicated above, the amount of edible salt used in the aqueous flavor composition is determined by the organoleptic properties desired in the final popped corn and generally the salt uptake is in the range of about 3-4% by weight of the unpopped popcorn kernels. Other added flavors may be included such as artificial butter, cheese, pizza flavors, etc., colors, sugar, sweeteners, other artificial or natural flavorings, colorings and spices.

In addition to a flavor such as salt and other flavorants, a hydrocolloid may be used such as starch, although it must be selected to provide acceptable texture. It is preferred to include starch as an acceptable hydrocolloid because it does not adversely affect the texture and mouth-feel of the finished popcorn product. As indicated above, a very minor amount of fat on the order of about 1-2% either in the form of vegetable shortening or oil performs several functions including flavor retention during microwave popping, intensification of the saltiness perception, flavor delivery in the mouth and uniform heat transfer during popping. When employing vegetable oil in order to achieve these advantages, a mist or a spray of the oil is applied uniformly to the treated kernels. Thus, in a most preferred form of the invention, an emulsion of salt, starch, flavor or flavor oil, and water is prepared and, immediately after vacuum treatment of the unpopped corn kernels, the kernels are soaked for about 1-5 minutes and then dried at room temperature. Thereafter, 1 or 2% oil is applied as uniform coating to the kernels. However, there are other forms of the invention where only salt and flavor with starch may be applied to form the flavored unpopped popcorn kernels before coating with oil. In another form, simply salt may be applied without starch and flavor and then a mist of oil may be applied to the kernels. In any of these techniques, a minor amount of oil may be employed to provide a no-fat or essentially fat-free popcorn product that has the flavor properties of conventional full-fat popcorn.

For a further understanding of the invention, reference is made to the following detailed examples.

DETAILED OPERATING EXAMPLES

Example I—Vacuum Treatment of Popcorn Kernels at 20° C. and Effect on Salt Absorption Popcorn kernels (85g; 12.6% moisture) were treated in a vacuum oven under 15 psi at 20° C. for 15 minutes (0.8% weight loss). Immediately thereafter, the popcorn kernels were soaked in a solution containing 10% salt for 5 minutes at room temperature. The excess solution was drained off the popcorn kernels and the kernels were soaked in deionized water for 15 seconds to wash off any indiscriminately bound surface salt. The kernels were dried in circulating air without adding heat. Salt uptake was measured by boiling 85 grams of kernels in 100 grams of water for 10 minutes and measuring the chloride concentration in the water by direct chloride titration. The results were reported as follows upon comparison with a control; the control being subjected to the identical treatment but without vacuum:

| Treatment | Amount of Salt Absorbed (% of popcorn weight) |
|---|---|
| Control | 0.36 ± 0.04 |
| Vacuum-treated | 0.49 ± 0.02 |

This vacuum-treatment had no significant effect on the popping rate when the salted kernels were popped by microwaving on high for about 2¼ to 3¼ minutes.

EXAMPLE II—Method of Preparing Popcorn Kernels for Microwave Popping and Sensory Evaluation Unpopped popcorn kernels in an amount of 85 grams were treated in a vacuum oven under 15 psi at 40° C. for about ten minutes. Immediately thereafter, the popcorn kernels were soaked in a solution containing 5 grams salt, 1 gram dry flavor and 5 grams of water for 5 minutes. The excess solution was drained off the popcorn kernels and the popcorn kernels were dried in circulating air without adding heat. After drying, the popcorn kernels were coated with melted vegetable shortening in an amount of about 1% total weight. Thereafter, the fat coated popcorn kernels were placed onto the susceptor pad of a microwave popcorn bag and sealed. Microwaving individual bags on high for about 2¼ to 3¼ minutes produced flavored popcorn having flavor retention during microwave cooking. A sensory evaluation was conducted blind by a sensory panel of 9 tasters and the results were reported as follows upon comparison with a control; the control being subjected to the identical treatment but without vacuum.

| Treatment | Average Sensory Score (n = 9) (intensity scale of 1 to 15) |
|---|---|
| Control | 4.89 ± 0.30 |
| Vacuum treated | 6.22 ± 0.37 |

This example demonstrates an improved flavored popcorn upon vacuum treatment.

EXAMPLE III—Method of Preparing Popcorn Kernels for Microwave Popping and Sensory Evaluation Unpopped popcorn kernels in an amount of 85 grams were treated in a vacuum oven under 15 psi at 40° C. for about ten minutes. Immediately thereafter, the popcorn kernels were soaked in a solution containing 1 gram of National Starch 46, 5 grams salt, 1 gram dry flavor and 5 grams of water for 5 minutes. The excess solution was drained off the popcorn kernels and the popcorn kernels were dried in circulating air without adding heat. After drying, the popcorn kernels were coated with melted vegetable shortening in an amount of about 1% total weight. Thereafter, the fat coated popcorn kernels were placed onto the susceptor pad of a microwave popcorn bag and sealed. Microwaving individual bags on high for about 2¼ to 3¼ minutes produced flavored popcorn having flavor retention during microwave cooking, and intensification of saltiness perception, flavor delivery in the mouth and uniform heat transfer during cooking. As indicated above, anything below about 1.5% fat may be labeled as fat-free under current label and serving size guidelines. Upon comparison with conventional full-fat popcorn product, similar organoleptic properties were achieved by the low-fat product of this invention. Adding 1% vegetable shortening before bagging produced a sensory improvement over the no-fat product and produced a more palatable product than adding 2% vegetable shortening. A 1% fat allows for better release and sustenance of the flavor as well as better mouth-feel.

EXAMPLE IV—Comparative Results

For comparison with the above Examples illustrating the practice of this invention, untreated popcorn kernels, when soaked in similar aqueous solutions of starch, flavor and salt, produce much less flavor and salt absorption. When mono- and diglycerides were emulsified with salt and flavor, unacceptable off-flavors were obtained. When a solution of flavor was treated in glycerine, the glycerine caused burning of the popcorn during baking. Treatment of the kernels with a solution of flavor in propylene glycol resulted in decreased popping and off-flavor development. Employing other various hydrocolloids, such as calcium alginate, carboxymethyl cellulose (CMC), pectin and modified starches tended to result in unacceptable texture ranging from excessively dry to slimy to tough. Accordingly, when a hydrocolloid is employed, starch is preferred according to the principles of this invention. The inclusion of alcohol in the aqueous solutions with starch, flavor and salt for both vacuum-treated and untreated popcorn kernels, resulted in decreased popping and unacceptable off-flavor generation. However, it will be understood that the aqueous flavor liquids of this invention for absorption into the vacuum-treated kernels of corn may be varied without departing from the essential aspects of this invention.

Other variations or modifications of the above description or operating examples may be made as will be understood by a person of ordinary skill in the art without departing from the scope of this invention.

What is claimed is:

1. A method for preparing flavored unpopped popcorn kernels comprising
   dehydrating unpopped popcorn kernels for a period of time sufficient to produce partially dehydrated kernels having retained sufficient moisture for popping and having an increased tendency to absorb an aqueous flavor liquid, and
   absorbing said aqueous flavor liquid into said partially dehydrated kernels to produce flavored unpopped popcorn kernels.

2. The method of claim 1 comprising dehydrating said kernels under vacuum at about 20° C. to about 40° C., coating the vacuum treated kernels with an aqueous solution of flavor and gently drying said coated kernels to provide free-flowing flavored popcorn kernels.

3. The method of claim 1 wherein said flavored liquid is a salt solution and said flavored kernels have salt absorbed into the kernels.

4. The method of claim 1 wherein said aqueous flavor liquid contains salt and another flavor.

5. The method of claim 1 wherein said flavored unpopped popcorn kernels are coated with a thin layer of vegetable oil.

6. The method of claim 5 wherein said vegetable oil is contained in an amount of from about 1% to about 2% by weight of said kernels.

7. The method of claim 1 wherein said aqueous flavor liquid contains salt, another flavor and a hydrocolloid.

8. The method of claim 7 wherein said hydrocolloid is starch.

9. The method of claim 1 comprising the further steps of popping said kernels to produce popped corn.

10. The method of claim 9 conducted by microwave heating.

11. A method for preparing flavored unpopped popcorn kernels comprising
    vacuum drying unpopped popcorn kernels for a period of time sufficient to produce partially dehydrated kernels having retained sufficient moisture for popping and having an increased tendency to absorb an aqueous salt solution,
    soaking said vacuum treated kernels with the salt solution,
    removing excess solution from said kernels and
    drying to form free-flowing unpopped kernels.

12. The method of claim comprising the additional step of coating said dried free-flowing kernels with a thin layer of vegetable oil.

13. The method of claim 12 comprising further step of placing said kernels in a conventional microwave bag for microwave cooking.

14. The method of claim 13 comprising the step of microwave heating.

15. The method of claim 11 wherein said vacuum drying is conducted at a temperature of about 20° C. to about 40° C.

16. The method of claim 11 comprising the further step of coating said dry kernels with a coating of about 1% to about 2% by weight of fat.

17. The method of claim 1 further comprising the addition of another flavor to the salt solution.

18. A method of preparing essentially fat-free flavored unpopped kernels comprising
    vacuum drying unpopped popcorn kernels for a period of time sufficient to produce partially dehydrated kernels having retained sufficient moisture for popping and having an increased tendency to absorb an aqueous flavor liquid,
    coating said vacuum treated kernels with the liquid containing a salt and flavor, and
    drying to form free-flowing unpopped kernels.

19. The method of claim 18 wherein said vacuum drying is conducted at a temperature of about 20° C. to about 40° C.

20. The method of claim 17 comprising the additional step of coating said dried free-flowing kernels with a thin layer of vegetable oil.

* * * * *